(12) United States Patent
Lu et al.

(10) Patent No.: US 9,501,194 B2
(45) Date of Patent: Nov. 22, 2016

(54) CLUSTERED SCAN METHOD OF CAPACITIVE TOUCH DEVICE

(71) Applicant: ELAN MICROELECTRONICS CORPORATION, Hsin Chu (TW)

(72) Inventors: Yi-Shiang Lu, Tainan (TW); Tsz-Hsuan Chao, Guishan Township, Taoyuan County (TW)

(73) Assignee: ELAN MICROELECTRONICS CORPORATION, Hsin Chu (TW)

(*) Notice: Subject to any disclaimer, the term of this patent is extended or adjusted under 35 U.S.C. 154(b) by 0 days.

(21) Appl. No.: 14/644,464

(22) Filed: Mar. 11, 2015

(65) Prior Publication Data

US 2015/0261353 A1    Sep. 17, 2015

(30) Foreign Application Priority Data

Mar. 12, 2014  (TW) .............................. 103108780 A (51) Int. Cl.
*G06F 3/041* (2006.01)
*G06F 3/044* (2006.01)

(52) U.S. Cl.
CPC ............. *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 7,812,827 B2 | 10/2010 | Hotelling et al. | |
| 2013/0057480 A1 | 3/2013 | Brunet et al. | |
| 2013/0076675 A1* | 3/2013 | Shin ...................... | G06F 3/0416 345/173 |
| 2013/0271410 A1 | 10/2013 | Krah et al. | |
| 2014/0149059 A1* | 5/2014 | Miyamoto .............. | G06F 3/044 702/65 |
| 2015/0234521 A1* | 8/2015 | Chao ...................... | G06F 3/044 345/174 |

* cited by examiner

*Primary Examiner* — Joseph Haley
(74) *Attorney, Agent, or Firm* — Muncy, Geissler, Olds & Lowe, P.C.

(57) ABSTRACT

A clustered scan method of a capacitive touch device is disclosed. According to the method, n drive lines of the capacitive touch device are divided into multiple clusters. Each of the clusters has a same number of drive lines. The clusters are driven by a clustered scan procedure in sequence. In each clustered scan procedure, the drive lines of the present cluster are driven for b times, wherein b is equal to the number of the drive lines of each cluster. If at least one bordering drive line exists, a bordering clustered scan procedure is executed, and a bordering drive line and some of drive lines of the previous clusters are driven.

16 Claims, 7 Drawing Sheets

| 步驟 | COLUMN STIMULATION ||||||||||||||| LCD | RESULT | START (ms) | END (ms) |
| | R0 | R1 | R2 | R3 | R4 | R5 | R6 | R7 | R8 | R9 | R10 | R11 | R12 | R13 | R14 | | | | |
|---|---|---|---|---|---|---|---|---|---|---|---|---|---|---|---|---|---|---|---|
| 0 | no | no | no | no | no | no | no | no | no | no | no | no | no | no | no | LCD | n/a | 0 | 12.0 |
| 1 | no | no | no | no | no | no | no | no | no | no | no | no | no | no | no | spectrum | 200-300 KHz | 12.0 | 12.2 |
| 2 | no | no | no | no | no | no | no | no | no | no | no | no | no | no | no | analyzer | 300-400 KHz | 12.2 | 12.4 |
| 3 | no | no | no | no | no | no | no | no | no | no | no | no | no | no | no | ID low noies fs | fA,fB,fC | 12.4 | 12.6 |
| 4 | +A | +B | +C | no | +A | +B | -C | no | +A | -B | -C | no | +A | -B | +C | scan | xa1*,xb1*,xc1* | 12.6 | 12.8 |
| 5 | +A | +B | +C | no | +A | -B | -C | no | -A | -B | +C | no | -A | +B | -C | scan | xa2*,xb2*,xc2* | 12.8 | 13.0 |
| 6 | +A | +B | +C | no | -A | -B | +C | no | -A | +B | +C | no | +A | -B | +C | scan | xa3*,xb3*,xc3* | 13.0 | 13.2 |
| 7 | +A | +B | +C | no | -A | +B | +C | no | +A | +B | -C | no | +A | +B | -C | scan | xa4*,xb4*,xc4* | 13.2 | 13.4 |
| 8 | no | +A | +B | +C | no | +A | +B | -C | no | +A | -B | -C | no | +A | -B | scan | xa5*,xb5*,xc5* | 13.4 | 13.6 |
| 9 | no | +A | +B | +C | no | -A | -B | -C | no | -A | -B | +C | no | -A | +B | scan | xa6*,xb6*,xc6* | 13.6 | 13.8 |
| 10 | no | +A | +B | +C | no | -A | -B | +C | no | -A | +B | +C | no | +A | -B | scan | xa7*,xb7*,xc7* | 13.8 | 14.0 |
| 11 | no | +A | +B | +C | no | -A | +B | +C | no | +A | +B | -C | no | +A | +B | scan | xa8*,xb8*,xc8* | 14.0 | 14.2 |
| 12 | +C | no | +A | +B | +C | no | +A | -B | -C | no | +A | -B | +C | no | +A | scan | xa9*,xb9*,xc9* | 14.2 | 14.4 |
| 13 | -C | no | +A | +B | +C | no | -A | -B | -C | no | -A | -B | +C | no | -A | scan | xa10*,xb10*,xc10* | 14.4 | 14.6 |
| 14 | +C | no | +A | +B | +C | no | -A | -B | +C | no | -A | +B | +C | no | +A | scan | xa11*,xb11*,xc11* | 14.6 | 14.8 |
| 15 | -C | no | +A | +B | +C | no | -A | +B | +C | no | +A | +B | -C | no | -A | scan | xa12*,xb12*,xc12* | 14.8 | 15.0 |
| 16 | -B | +C | no | +A | +B | +C | no | +A | +B | -C | no | +A | -B | -C | no | scan | xa13*,xb13*,xc13* | 15.0 | 15.2 |
| 17 | +B | -C | no | +A | +B | +C | no | -A | -B | -C | no | -A | -B | +C | no | scan | xa14*,xb14*,xc14* | 15.2 | 15.4 |
| 18 | -B | +C | no | +A | +B | +C | no | -A | -B | +C | no | -A | +B | +C | no | scan | xa15*,xb15*,xc15* | 15.4 | 15.6 |
| 19 | +B | -C | no | +A | +B | +C | no | -A | +B | +C | no | +A | +B | -C | no | scan | xa16*,xb16*,xc16* | 15.6 | 15.8 |

CLUSTERED SCAN METHOD OF CAPACITIVE TOUCH DEVICE

BACKGROUND OF THE INVENTION

1. Field of the Invention

The present invention relates to a scan method of a capacitive touch device, and especially relates to a clustered scan method of a capacitive touch device.

2. Description of the Related Art

Currently capacitive touch devices usually have two types of scan methods, namely, self-capacitance scanning method and mutual-capacitance scanning method. Various types of mutual-capacitance scanning methods have been developed and dedicated for different demands of capacitive touch devices. Clustered scan method is one of the mutual-capacitance scanning methods. Several examples of the clustered scan method are described as follows.

Figure 4A:
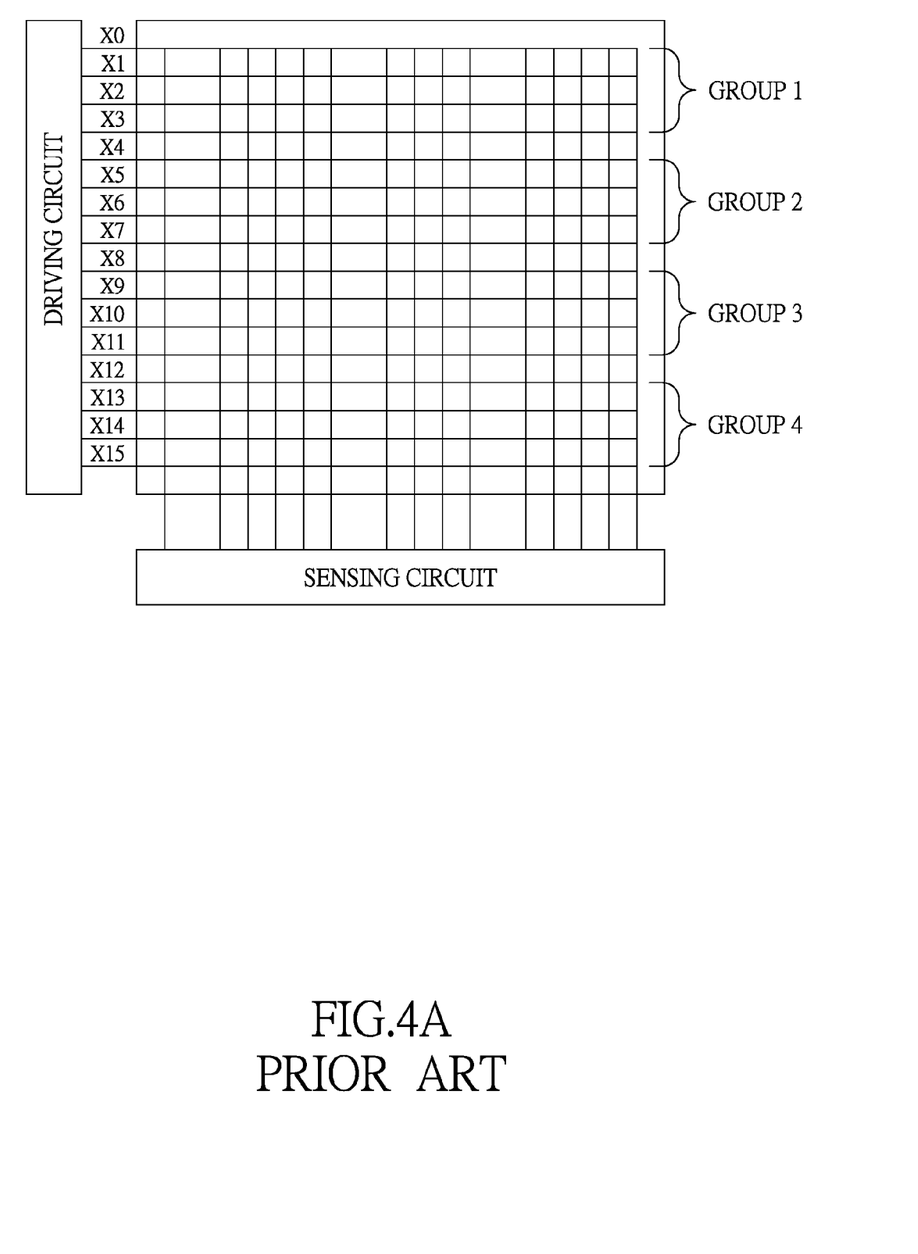
FIG. 4A is a schematic view of a capacitive touch device of a clustered scan method of a conventional clustered scan method.
Figure 4B:
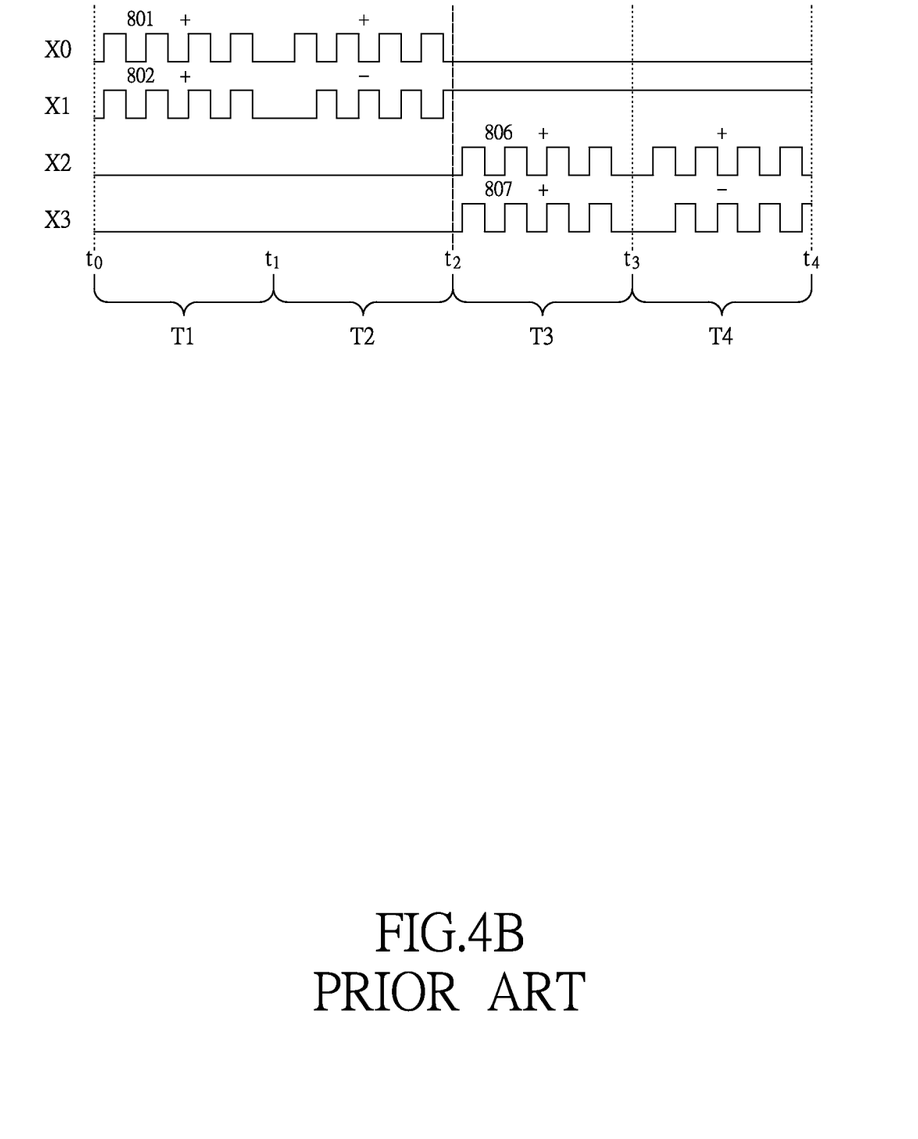
FIG. 4B is a timing sequence diagram of driving signals of the conventional clustered scan method of FIG. 4A.

As disclosed in U.S. Pat. No. 7,812,827, a simultaneous sensing arrangement technique is applied to a capacitive touch device having multiple sensing points intersected by drive lines and sense lines. Such technique can enhance operation of multi-touch sensing configuration by simultaneously driving multiple rows of the drive lines of the capacitive touch device. With reference to FIG. 4A, given 16 drive lines X0-X15 as an example, the drive lines can be classified into four groups, that is, groups 1-4. Each group includes four drive lines. With reference to FIG. 4B, according to the clustered scan method disclosed by said US patent, two driving signals 801, 802 are simultaneously output to the drive lines in the groups 1 and 2, and sensed values are represented by X0, X1. As the two driving signals have four in-phase pulses heading in a time duration T1 and four pulses mutually phase-shifted by a 180-degree trailing in a time duration T2, the sensed values in the time durations T1 and T2 can be considered as (X0+X1) and (X0−X1) respectively.

Likewise, after two driving signals 806, 807 are applied to the drive lines in groups 3 and 4 in time durations T3 and T4, sensed values (X2+X3) and (X2−X3) are respectively obtained. By sending driving signals to all the drive lines of each non-overlapped group and varying phases of the driving signals, finger touch can be preliminarily determined by a combined result of the sensed values X0-X3.

Another clustered scan method is disclosed by US Patent Publication No. 2013/0271410 and applied to an integrated type of liquid crystal display (LCD) touch display of a capacitive touch device. The clustered scan method primarily uses driving signals with different frequencies to scan first, and then determines a noise value under each driving signal. The lower the noise value is, the fewer noise a corresponding driving signal has. Those driving signals with relatively low noise will be used to perform scanning.

With reference to FIG. 5, in steps 4 to 19, a vertical blank interval (VBI) of an LCD display device is used for scanning fifteen drive lines. Three driving signals with different frequencies A to C are applied to the fifteen drive lines in steps 4 to 7. The driving signal with the frequency A is simultaneously applied to the drive lines indicated by R0, R4, R8 and R12. The driving signal with the frequency B is simultaneously applied to the drive lines indicated by R1, R5, R9 and R13. The driving signal with the frequency C is simultaneously applied to the drive lines indicated by R3, R7, R11 and R14. The rest of the drive lines are not driven.

In steps 8 to 11, the foregoing three driving signals are simultaneously applied to the subsequent drive lines next to the drive lines previously driven in steps 4 to 7. In other words, the driving signal with frequency A is simultaneously applied to the drive lines indicated by R1, R5, R9 and R13, the driving signal with frequency B is simultaneously applied to the drive lines indicated by R2, R6, R10 and R14, the driving signal with frequency C is simultaneously applied to the drive lines indicated by R4, R8 and R12, and the rest of the drive lines are not driven. The three driving signals are repeatedly applied in a similar fashion until the scanning process from steps 4 to 11 can be carried out four times. During each scanning process, the phases of the frequencies A, B, C of the driving signals can be further changed and marked by -A, -B and -C. Hence, the use of driving signals with different frequencies and phases can increase the scanning speed and provide better signal-to-noise ratio (SNR).

Figure 6:
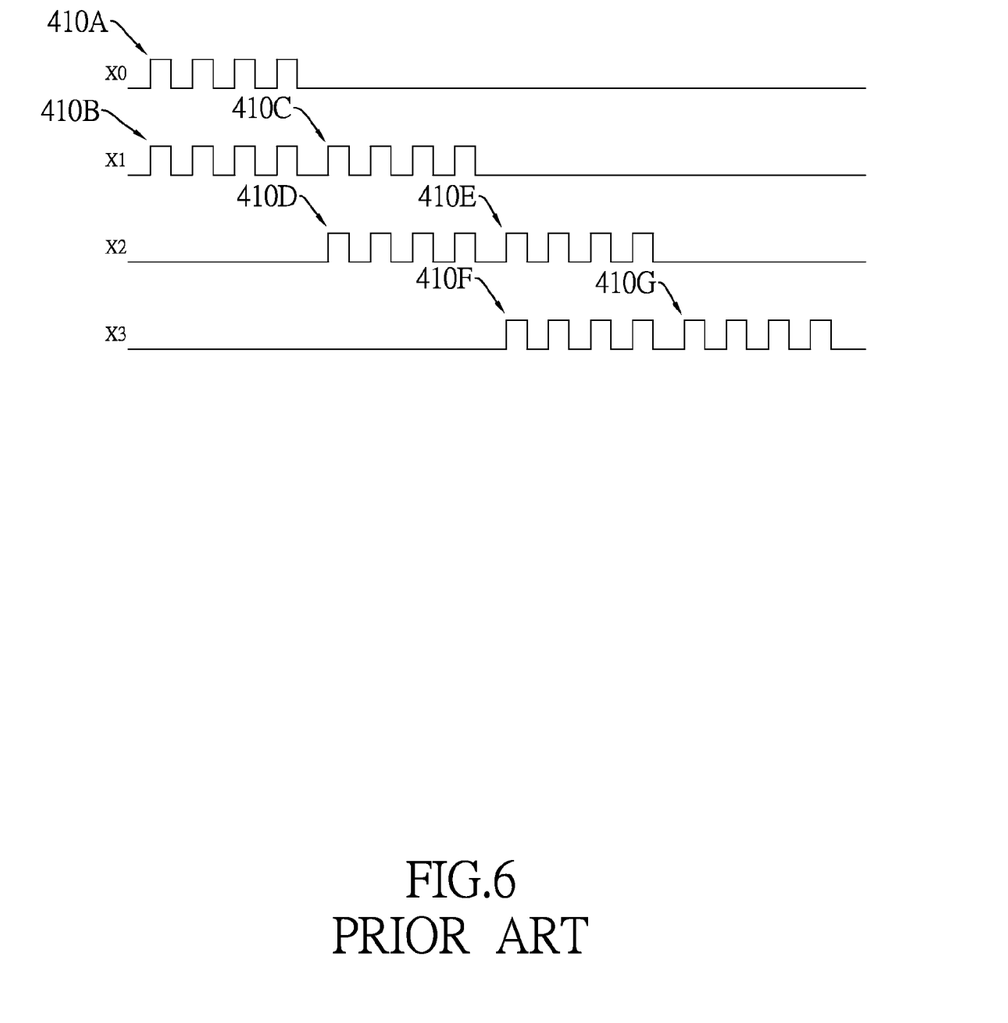
FIG. 6 is a timing sequence diagram of driving signals of still another conventional clustered scan method.

To cope with the issue of unsatisfactory SNR, US Patent Publication No. 2013/0057480 discloses a technique pertinent to "signal-to-noise ratio in touch" to increase SNR and measurement accuracy of a signal generated by touch event or an approaching touch object. With reference to FIG. 6, the technique involves simultaneous application of driving signals 410A, 410B to two drive lines X0, X1. Given four drive lines X0-X3 as an example, consecutive two of the drive lines (X0, X1), (X1, X2), (X2, X3) are sequentially driven. Suppose that the voltage level of the driving signals 410A-410G is identical to the voltage level of the driving signal that drives only one drive line, when two drive lines are driven at the same time, a sensing value of a corresponding sense line is doubled. Hence, the SNR increases. However, despite the disclosure of simultaneously driving two, three or four drive lines for the purpose of higher SNR, this technique fails to point out how bordering drive lines should be driven when multiple drive lines are simultaneously driven. For example, if there are n drive lines, when two drive lines are simultaneously driven, the sensing values of non-bordering drive lines, such as the second drive line to the $(n-2)^{th}$ drive line, may be as twice as the sensing value of the bordering sense line, such as the first sense line or the last sense line, and a false touch determination may occur.

From the foregoing examples of the clustered scan method, the clustered scan method is rather common to touch devices. Different clustered scan methods are addressed for corresponding touch devices and technical issues thereof to be resolved. However, none of the clustered scan methods points out how bordering drive lines should be driven.

SUMMARY OF THE INVENTION

An objective of the present invention is to provide a clustered scan method of a capacitive touch device capable of increasing the signal to noise ratio (SNR) of the capacitive touch device.

To achieve the foregoing objective, a clustered scan method of a capacitive touch device having n drive lines X1 to Xn and a sense line, wherein the n drive lines are divided into C clusters and k bordering drive lines, each cluster has b driving lines, and C, b, and k are positive integers, and the clustered scan method comprising:

(s1) sequentially driving each of the C clusters to obtain sensed values of sense points crossed by the drive lines of the cluster and the sense line; wherein when driving each of the C clusters, b drive lines of the cluster are driven simultaneously; and (s2) executing a scanning process for driving the bordering drive lines, wherein the scanning process comprises:

(a) simultaneously driving b drive lines including the $n^{th}$ drive line k times by using k combinations of driving signals to obtain sensed values $A_n, A_{n-1}, \ldots, A_{n-k+1}$ of the sense line; and (b) determining the sensed values of sense points crossed by the drive lines from the $n^{th}$ drive line to the $(n-k+1)^{th}$ drive line and the sense line according to the sensed values $A_n, A_{n-1}, \ldots, A_{n-k+1}$ of the sense line.

The clustered scan method provides a clustered scanning technique to drive k bordering drive lines.

According to the present invention, the clustered scan method may further comprise:

predetermine whether the sensed values of sense points crossed by the drive lines from the $n^{th}$ drive line to the $(n-k+1)^{th}$ drive line and the sense line can be obtained through the k times of driving, and modifying the combinations of the driving signals if the sensing values of the sense points cannot be obtained, and then executing the step (a) with the modified combinations of the driving signals to obtain the sensed values of the sense points.

Other objectives, advantages and novel features of the invention will become more apparent from the following detailed description when taken in conjunction with the accompanying drawings.

BRIEF DESCRIPTION OF THE DRAWINGS

FIG. 5 is a timing sequence diagram of driving signals of another conventional clustered scan method.

DETAILED DESCRIPTION OF THE INVENTION

The present invention addresses a clustered scan method applied to a capacitive touch device 10. The following description explains how the clustered scan method drives bordering drive lines of the capacitive touch device 10 to acquire sensed values of sense points corresponding to the bordering drive lines.

Figure 1:
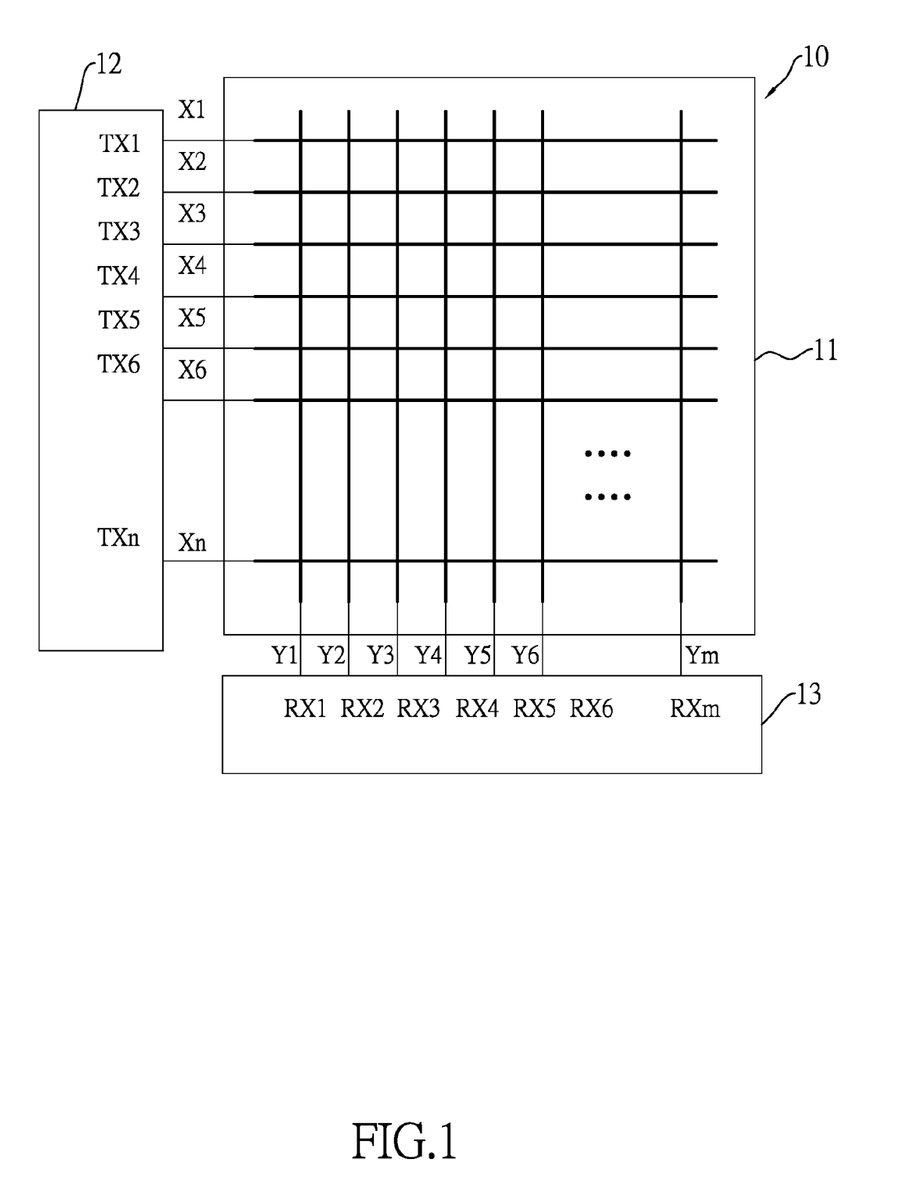
FIG. 1 is schematic view of a capacitive touch device of a clustered scan method in accordance with the present invention.

With reference to FIG. 1, the capacitive touch device 10 has a touch panel 11, a driving circuit 12 and a sensing circuit 13. The touch panel 11 may have n drive lines X1-Xn and m sense lines Y1-Ym. The drive lines X1-Xn and the sense lines Y1-Ym are intersected to each other. Each point crossed by a corresponding drive line and a corresponding sense line is taken as a sense point. When the driving circuit 12 executes a clustered scan, a number b of drive lines in a cluster is preset. The n drive lines of the capacitive touch device 10 can be divided into C clusters. Each cluster includes b drive lines. The C, b, n are positive integers.

In a first example, n equals ten (n=10), namely, the touch panel 11 includes ten drive lines X1-X10. The driving circuit 12 presets the number b of the drive lines in the cluster to be three (b=3). Because n is not divisible by b, a remainder k exists (k=1). The touch panel 11 comprises three clusters (C=3) and one bordering drive line X10. When the clustered scan is executed, the driving circuit 12 drives the three clusters in sequence. For each cluster, a clustered scan procedure is executed three times as described below.

Figure 2:
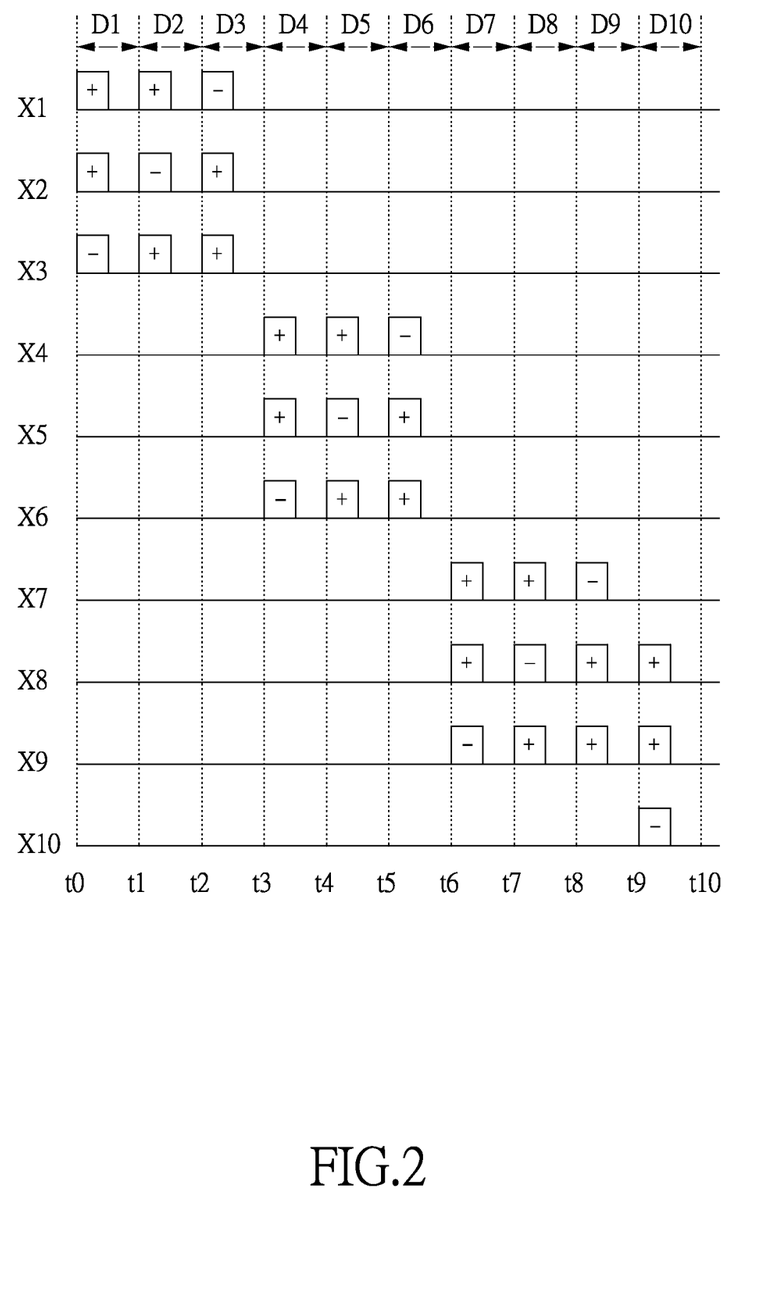
FIG. 2 is a timing sequence diagram of driving signals of a first embodiment of a clustered scan method of the present invention.

With reference to FIG. 2, the first cluster C1 is firstly scanned. The three drive lines X1-X3 of the first cluster C1 are simultaneously driven for three times by three different combinations of the driving signals. When each time the first cluster C1 is driven, sensed values of the sense lines Y1-Ym are obtained, and are converted from analog values to digital values. The sensed value of any sense line Y1-Ym means a sum of all sensed values of the sense points crossed by the drive lines X1-X3 and the corresponding sense line Y1-Ym. Taking the sensed values detection on the first sense line Y1 as an example, three sums A1-A3 can be obtained respectively through the three times of clustered scan procedure. Each of the sums A1-A3 represents a summation of sensed values of the sense points crossed by the drive line X1-X3 and the first sense line Y1. The sum A1 is the summation of the sensed values when the first combination of the driving signals is applied, the sum A2 is the summation of the sensed values when the second combination of the driving signals is applied, and the sum A3 is the summation of the sensed values when the third combination of the driving signals is applied.

Subsequently, the second cluster C2 is scanned. The three drive lines X4-X6 of the second cluster C2 are simultaneously driven for three times by three different combinations of the driving signals. When each time the second cluster C2 is driven, sensed values of the sense lines Y1-Ym are detected and converted from analog values to digital values. Taking the sensed values detection on the first sense line Y1 as an example, three different sums A4-A6 can be obtained respectively through the three times of clustered scan procedure. Each sum A4-A6 represents a summation of sensed values of the sense points crossed by the drive line X4-X6 and the first sense line Y1. The sum A4 is the summation of the sensed values when the first combination of the driving signals is applied, the sum A5 is the summation of the sensed values when the second combination of the driving signals is applied, and the sum A6 is the summation of the sensed values when the third combination of the driving signals is applied.

Subsequently, the third cluster C3 is scanned. The three drive lines X7-X9 of the third cluster C3 will be driven for three times by three different combinations of the driving signals. When each time the third cluster C3 is driven, sensed values of the sense lines Y1-Ym are detected, and are converted from analog values to digital values. Reading the sensed values of the first sense line Y1 as an example, three different sums A7-A9 can be obtained respectively through the three times of clustered scan procedure. Each sum A7-A9 represents a summation of sensed values of the sense points crossed by the drive line X7-X9 and the first sense line Y1. The sum A7 is the summation of the sensed values when the first combination of the driving signals is applied, the sum A8 is the summation of the sensed values when the second combination of the driving signals is applied, and the sum A9 is the summation of the sensed values when the third combination of the driving signals is applied.

Driving the three drive lines X1-X3 of the first cluster C1 and detecting the sensed values from the first sense line Y1 is taken as an example. The detected sensed values of the sense points crossed by the drive lines X1-X3 and the sense line Y1 are respectively represented as a1-a3. When the drive lines X1-X3 are driven for the first time, the sum A1 obtained from the sense line Y1 is a summation of the sensed values a1, a2, and a3. When the drive lines X1-X3 are driven for the second time, the sum A2 obtained from the sense line Y1 is a summation of the sensed values a1, a2, and a3. When the drive lines X1-X3 are driven for the third time, the sum A3 obtained from the sense line Y1 is a summation of the sensed values a1, a2, and a3.

In the three times of driving, the driving circuit 12 selects three different combinations of the driving signals as follows to drive the three drive lines X1-X3.

$$C_{11} \times x1 + C_{12} \times x2 + C_{13} \times x3$$

$$C_{21} \times x1 + C_{22} \times x2 + C_{23} \times x3$$

$$C_{31} \times x1 + C_{32} \times x2 + C_{33} \times x3$$

$C_{11}$-$C_{13}$, $C_{21}$-$C_{23}$, and $C_{31}$-$C_{33}$ are three groups of different driving coefficients, and x1-x3 represent the three driving signals output to the three drive lines X1-X3. [$C_{11} \times x1$, $C_{12} \times x2$, $C_{13} \times x3$], [$C_{21} \times x1$, $C_{22} \times x2$, $C_{23} \times x3$], and [$C_{31} \times x1$, $C_{32} \times x2$, $C_{33} \times x3$] are the three different combinations of the driving signals for driving the three drive lines X1-X3 of the first cluster C1 for three times so as to respectively obtain the sums A1, A2 and A3 from the sense line Y1.

In a first embodiment of the combination of the driving signals, the driving signals x1-x3 are square waves having the same frequency, and the driving coefficients $C_{11}$-$C_{13}$, $C_{21}$-$C_{23}$, and $C_{31}$-$C_{33}$ may be positive or negative. There is a phase difference between a positive driving signal and a negative driving signal. For example, there is a phase difference of 180 degrees between the +x1 and the −x2.

In a second embodiment of the combination of the driving signals, the driving signals x1-x3 are square waves having the same frequency, and the driving coefficients $C_{11}$-$C_{13}$, $C_{21}$-$C_{23}$, and $C_{31}$-$C_{33}$ may be positive or zero. For example, when the driving signal has the zero coefficient (0×x1=0), it means the driving circuit 12 will not output the driving signal. Each combination of the driving signals includes b driving signals, and each of the b driving signals may be a positive driving signal, zero, or a negative driving signal.

By using the first embodiment of the combination of the driving signals mentioned above, the sums A1-A3 obtained from the first sense line Y1 can be expressed by the three following sensing equations.

$$\pm a1 \pm a2 \pm a3 = A1 \quad (1\text{-}1)$$

$$\pm a1 \pm a2 \pm a3 = A2 \quad (2\text{-}1)$$

$$\pm a1 \pm a2 \pm a3 = A3 \quad (3\text{-}1)$$

a1-a3 are the sensed values of the sense points crossed by the drive lines X1-X3 and the sense line Y1, and the sign "±" is the driving coefficient of the driving signal corresponding to the sensed value and may be either positive or negative. When the driving circuit 12 drives the drive lines X1-X3 three times and the sums A1-A3 are obtained, the sensed values a1-a3 can be determined by solving the three sensing equations (1-1) to (3-1). Similarly, the sensed values of the sense points crossed by the drive lines X1-X3 and the sense lines Y2-Ym can be calculated according to the sensed values obtained from sense lines Y2-Ym.

After finishing the scan of the first cluster C1, the driving circuit 12 scans the drive lines X4-X6 of the second cluster C2, and the sums A4-A6 obtained from the first sense line Y1 can be expressed by the following sensing equations.

$$\pm a4 \pm a5 \pm a6 = A4 \quad (4\text{-}1)$$

$$\pm a4 \pm a5 \pm a6 = A5 \quad (5\text{-}1)$$

$$\pm a4 \pm a5 \pm a6 = A6 \quad (6\text{-}1)$$

a4-a6 are the sensed values of the sense points crossed by the drive lines X4-X6 and the sense line Y1, and the sign "±" is that the driving coefficient of the driving signal corresponding to the sensed value and may be either positive or negative. When the driving circuit 12 drives the drive lines X4-X6 three times and the sums A4-A6 are obtained, the sensed values a4-a6 can be determined by solving the three sensing equations (4-1) to (6-1) Similarly, the sensed values of the sense points crossed by the drive lines X4-X6 and the sense lines Y2-Ym can be calculated according to the sensed values obtained from sense lines Y2-Ym.

Subsequently, the driving circuit 12 scans the drive lines X7-X9 of the third cluster C3, and the sums A7-A9 obtained from the first sense lines Y1 can be expressed by the following sensing equations.

$$\pm a7 \pm a8 \pm a9 = A7 \quad (7\text{-}1)$$

$$\pm a7 \pm a8 \pm a9 = A8 \quad (8\text{-}1)$$

$$\pm a7 \pm a8 \pm a9 = A9 \quad (9\text{-}1)$$

a7-a9 are the sensed values of the sense points crossed by the drive lines X7-X9 and the sense line Y1, and the sign "±" is the driving coefficient of the the driving signal corresponding to the sensed value and may be either positive or negative. When the driving circuit 12 drives the drive lines X7-X9 three times and the sums A4-A6 are obtained, the sensed values a7-a9 can be determined by solving the three sensing equations (7-1) to (9-1). The sensed values of the sense points crossed by the drive lines X7-X9 and the sense lines Y2-Ym can be calculated according to the sensed values obtained from sense lines Y2-Ym.

Eventually, only the sensed values of the sense points crossed by the last drive line X10 and the sense line Y1-Ym are yet unknown. The drive line X10 is the bordering drive line. In one embodiment, the driving circuit 12 determines whether a remainder k exists by dividing n by b. When the remainder k exists, a bordering drive line scanning step is executed, wherein k means a number of the bordering drive lines. In another embodiment, the $n^{th}$ drive line Xn is preset as the bordering drive line. For the bordering drive line Xn, the driving circuit 12 simultaneously drives b drive lines including the $n^{th}$ drive line. According to the embodiment, the driving circuit 12 drives the drive lines X8-X10 k times by k combinations of the different driving signals. Because k=1, the driving circuit 12 drives the drive lines X8-X10 one time and the sum A10 of the sensed values of the sense line Y1 is detected, wherein the sum A10 can be expressed by the sensing equation $\pm a8 \pm a9 \pm a10 = A10$. The sign "±" is the driving coefficient of the driving signal corresponding to the sensed value and may be either positive or negative. Because the sensed values a8 and a9 have been calculated through the driving of the third cluster C3, the sensed value a10 in the foregoing equation can be calculated according to the known sensed values a8 and a9.

When the driving circuit 12 drives the bordering drive line Xn, the b drive lines of a cluster including from the $n^{th}$ drive line (Xn) to the $(n-b+1)^{th}$ drive lines are driven. The sensed values of sense points crossed by the drive lines between the $(n-k)^{th}$ drive line and the $(n-b)^{th}$ drive line and the sense line Y1 have been obtained through the driving of the previous cluster. Therefore, the unknown sensed values of sense points crossed by the bordering drive line and the sense line can be calculated by solving the sensing equations according to the obtained sensed values.

The sensed values of the sensed points crossed by all of the drive lines X1-Xn and the first sense line Y1 are calculated by the foregoing statements. The sensed values of the sensed points crossed by the drive lines X1-Xn and other sense lines Y2-Ym can be obtained by same steps. All the sensed values of the sensed points crossed by the drive lines X1-Xn and the sense lines Y1-Ym can be obtained by scanning C*b+k=n times, and then an identifying procedure may be executed for identifying an object position.

Figure 3:
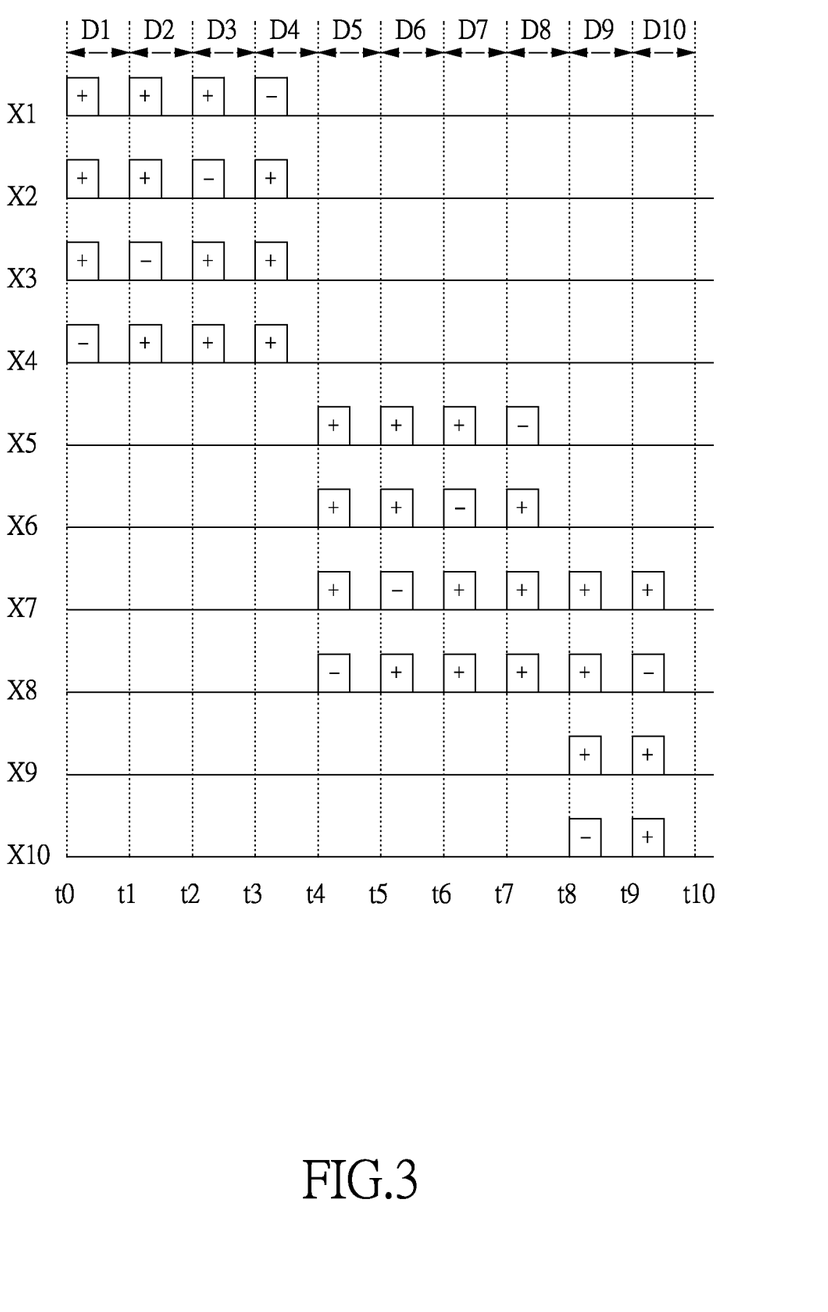
FIG. 3 is a timing sequence diagram of driving signals of a second embodiment of a clustered scan method of the present invention.

In another embodiment, the touch panel 11 has ten drive lines (n=10), and each cluster has four drive lines (b=4). With reference to FIG. 3, n is not divisible by b, and the remainder k exists (k=2). The capacitive touch device 10 has two clusters (C=2) and two bordering drive lines X9, X10. When the clustered scan is executed, the driving circuit 12 drives the two clusters in sequences. When each cluster is driven, the clustered scan procedure is executed four times as described below.

Taking the sensed values detection on the first sense line Y1 as an example, and other sensed values of the sense lines Y2-Ym can be determined by the same steps. When using the first embodiment of the combination of the driving signals, the driving circuit 12 scans the first cluster four times to obtain four different sums A1-A4. By solving sensing equations corresponding to the A1-A4, the sensed values a1-a4 of the sense points crossed by the drive lines X1-X4 and the sense lines Y1 are determined. When the second cluster is scanned, four different sums A5-A8 are obtained. By solving the four sensing equations corresponding to A5-A8, the sensed values a5-a8 of the sense points crossed by the drive lines X5-X8 and the sense lines Y1 are determined.

After the second cluster is scanned, the driving circuit 12 determines that the remainder k exists. When k exists, the scanning steps for driving the bordering drive lines X9-X10 are executed. The driving circuit 12 drives b drive lines including the $n^{th}$ and the $(n-1)^{th}$ drive lines. In this embodiment, the b equals four (b=4), and the driving circuit 12 drives the four drive lines X7-X10 k times by k combinations of the driving signals. Each combination in the k combinations is different. Because k=2, the driving circuit 12 drives the four drive lines X7-X10 two times and reads the sensed values of the sense line Y1. The sensed value of the sense line Y1 can be expressed by sensing equations.

$$\pm a7 \pm a8 \pm a9 \pm a10 = A9$$

$$\pm a7 \pm a8 \pm a9 \pm a10 = A10$$

The sensed values a7 and a8 are known, and the sums A9 and A10 are detected from the sense line Y1. Only the sensed values a9 and a10 are unknown. The sign "±" is the driving coefficients of the driving signal corresponding to the sensed value and may be either positive or negative. The sensed values a9 and a10 can be determined by solving the sensing equations according to the known sensed values a7 and a8 and the sums A9 and A10. Therefore, the sensed values of the sensed points crossed by the drive lines X1-X10 and the sense line Y1 can be determined. Similarly, the sensed values of the sense points crossed by the drive lines X1-X10 and other sense lines Y2-Ym can be determined according to the sense values obtained from the sense lines Y2-Ym.

Except for the two embodiments (b=3 or b=4) mentioned above, the number of the clusters may be another positive integer (b=5 to (n-1)). To sum up, when there is bordering drive line Xn, for example a remainder k exists by dividing n by b, the driving circuit 12 executes the following steps:

(a) simultaneously driving b drive lines including the $n^{th}$ drive line k times by k combinations of driving signals to respectively obtain sensed values $A_n, A_{n-1}, \ldots, A_{n-k+1}$ of the sense lines; and (b) determining the sensed values of sense points corresponding to the drive lines from the $n^{th}$ drive line to the $(n-k+1)^{th}$ drive line according to the sensed values $A_n, A_{n-1}, \ldots, A_{n-k+1}$.

To make sure the sensed values of the sensed points crossed by the bordering drive lines and the sense lines can be obtained, the following determining steps can be used.

When the first embodiment of the combination of the driving signals is adopted, the driving circuit 12 may pre-determine whether the combinations of driving signals for k scan times may cause the sensing equations to have no solutions. When the k sensing equations have no solutions, the combinations of driving signals will be pre-modified. Then the step (a) is executed.

Using the second embodiment, k is two (k=2), and the driving circuit 12 can predetermine which combinations of driving signals cause the sensing equations to have no solutions. For example, when scanning the first cluster and the second cluster, it is expectable that the driving coefficients [1,1,1,-1], [1,1,-1,1] applied to the drive lines X7-X10 for scanning two times may render the corresponding sensing equations to have no solutions, which means the unknown sensed values cannot be calculated. Therefore, the driving coefficients need to be reselected. With reference to FIG. 3, when the driving coefficients [1,1,1,-1], [1,-1,1,1] are selected and used to scan the drive lines X7-X10, the obtained two sensing equations can have solutions so as to calculate the sensed values of the sensed points crossed by the drive lines X9-X10 and the sense line Y1. Therefore, before the step (a), the driving circuit 12 may predetermine whether combinations of driving signals for k scanning times cause the sensing equations to have no solutions. When the sensing equations have no solutions, the combinations of driving signals are pre-modified, and then the step (a) is executed.

When using the second embodiment that driving coefficient for the combinations of the driving signals comprises zero, the method may further determine whether the driving coefficient corresponding to the bordering drive line is zero during the k scanning times. When the driving coefficient of the bordering drive line is zero, the sensed value obtained from the sense line does not include the sensed values of the sensed points crossed by the sense line and the bordering drive line. Therefore, the unknown sensed values corresponding to the bordering drive line cannot be determined by solving the sensing equations. The combinations of driving signals need to be modified. Before scanning the $n^{th}$ drive line to the $(n-k+1)^{th}$ drive line, when the combinations of driving signals are predetermined to ensure that the sensing simultaneous equations have solutions, the sensed values of the sensing points can be obtained.

In conclusions, when the bordering drive lines exist, the clustered scan method with the present invention provides a scanning technique by which the number of the drive lines been scanned in the cluster including the bordering drive lines is the same as the number of the drive lines scanned in other clusters.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A clustered scan method of a capacitive touch device having n drive lines X1 to Xn and a sense line, wherein the n drive lines are divided into C clusters and k bordering drive lines, each cluster has b driving lines, and C, b, and k are positive integers, and the clustered scan method comprising:
   - (s1) sequentially driving each of the C clusters to obtain sensed values of sense points crossed by the drive lines of the cluster and the sense line; wherein when driving each of the C clusters, b drive lines of the cluster are driven simultaneously; and
   - (s2) executing a scanning process for driving the bordering drive lines, wherein the scanning process comprises:
     - (a) simultaneously driving b drive lines including the $n^{th}$ drive line k times by using k combinations of driving signals to obtain sensed values $A_n, A_{n-1}, \ldots, A_{n-k+1}$ of the sense line; and
     - (b) determining the sensed values of sense points crossed by the drive lines from the $n^{th}$ drive line to the $(n-k+1)^{th}$ drive line and the sense line according to the sensed values $A_n, A_{n-1}, \ldots, A_{n-k+1}$ of the sense line;
   - wherein in the step (b), the sensed values of the sense points crossed by the drive lines from the $n^{th}$ drive line to the $(n-k+1)^{th}$ drive line and the sense line are obtained based on the sensed values of the sense points crossed by the drive lines from the $(n-k)^{th}$ drive line to the $(n-b+1)^{th}$ drive line and the sense line.

2. The clustered scan method as claimed in claim 1, wherein the sensed values, $A_n, A_{n-1}, \ldots, A_{n-k+1}$ in step (a) are represented by sensing equations respectively, and the clustered scan method further comprises:
   - predetermining whether the sensing equations corresponding to the k combinations of driving signals have no solutions, when the sensing simultaneous equations have no solutions, modifying the k combinations of the driving signals and then executing the step (a).

3. The clustered scan method as claimed in claim 2, wherein in the step (b), the sensed values of the sense points crossed by the drive lines from the $n^{th}$ drive line to the $(n-k+1)^{th}$ drive line and the sense line are obtained based on the sensed values of the sense points crossed by the drive lines from the $(n-k)^{th}$ drive line to the $(n-b+1)^{th}$ drive line and the sense line.

4. The clustered scan method as claimed in claim 1, wherein each of the combinations of the driving signals comprises b driving signals, and each driving signal is a positive driving signal, zero, or a negative driving signal.

5. The clustered scan method as claimed in claim 3, wherein each of the combinations of the driving signals comprises b driving signals, and each driving signal is a positive driving signal, zero, or a negative driving signal.

6. The clustered scan method as claimed in claim 4, wherein b is a positive integer between 3 and (n−1).

7. The clustered scan method as claimed in claim 5, wherein b is a positive integer between 3 and (n−1).

8. The clustered scan method as claimed in claim 6, wherein the sensed values $A_n, A_{n-1}, \ldots, A_{n-k+1}$, are digital values converted from analog values obtained by sensing the sensing line.

9. The clustered scan method as claimed in claim 7, wherein the sensed values $A_n, A_{n-1}, \ldots, A_{n-k+1}$, are digital values converted from analog values obtained by sensing the sensing line.

10. The clustered scan method as claimed in claim 8, wherein the driving signals for driving different drive lines have a same frequency.

11. The clustered scan method as claimed in claim 9, wherein the driving signals for driving different drive lines have a same frequency.

12. The clustered scan method as claimed in claim 10, wherein the different clusters respectively correspond to different drive lines.

13. The clustered scan method as claimed in claim 11, wherein the different clusters respectively correspond to different drive lines.

14. The clustered scan method as claimed in claim 12, wherein the positive signal and the negative signal are generated by phase shifting.

15. The clustered scan method as claimed in claim 13, wherein the positive signal and the negative signal are generated by phase shifting.

16. The clustered scan method as claimed in claim 1, wherein the k bordering drive lines are determined by whether a reminder k exists, and the reminder k is obtained by dividing n by b.

* * * * *